United States Patent [19]

Barr

[11] Patent Number: 4,528,860
[45] Date of Patent: Jul. 16, 1985

[54] TRANSFER DRIVE APPARATUS

[75] Inventor: Gaitskill S. Barr, Franklin, Mich.

[73] Assignee: Expert Automation, Inc., Sterling Heights, Mich.

[21] Appl. No.: 328,065

[22] Filed: Dec. 7, 1981

[51] Int. Cl.³ .............................................. F16H 21/18
[52] U.S. Cl. ........................................................ 74/52
[58] Field of Search ............................................ 74/52

[56] References Cited

U.S. PATENT DOCUMENTS

| 637,020 | 11/1899 | Owen | 74/52 X |
|---|---|---|---|
| 2,524,734 | 10/1950 | Pfau | 74/52 X |
| 2,553,858 | 5/1951 | Kreis | 74/52 |
| 2,628,024 | 2/1953 | Greenwood, Jr. | 74/52 |
| 3,921,465 | 11/1975 | Hosoda et al. | 74/52 |
| 3,956,942 | 5/1976 | Seki et al. | 74/52 |
| 4,023,420 | 5/1977 | Dressler | 74/52 |
| 4,089,228 | 5/1978 | Obra | 74/52 |

FOREIGN PATENT DOCUMENTS

| 57-27646 | 2/1982 | Japan | 74/52 |
| 353593 | 5/1961 | Switzerland | 74/52 |

OTHER PUBLICATIONS

*Product Engineering,* "5 Cardan-Gear" by Sigmund Rappaport, Sep. 28, 1959, vol. 30, pp. 66 and 67.

*Primary Examiner*—Leslie A. Braun
*Assistant Examiner*—Dwight G. Diehl
*Attorney, Agent, or Firm*—Harness, Dickey & Pierce

[57] ABSTRACT

A transfer drive mechanism (10, 62, 81, 116, 136, 166) for use in conjunction with work transfer apparatus is disclosed which is operative to provide extremely smooth rapid acceleration/deceleration while substantially eliminating the high stresses and potential workpiece dislocating jerk often associated with such drive systems. The drive mechanism comprises a planetary gear (26, 52, 76, 93, 128, 160, 178) having an eccentric follower means (30, 56, 80, 97, 162, 176) which is adapted to be revolved around a stationary sun gear (28, 54, 70, 88, 130, 138, 180) which imparts a rotating motion thereto. The relative diameters of the sun gear (28, 54, 70, 88, 130, 138, 180) and planet gear (26, 52, 76, 93, 128, 160, 178) and the positioning of the eccentric follower means (30, 56, 80, 97, 162, 176) are all interrelated so as to provide a controlled acceleration transfer motion wherein the acceleration and jerk in the direction of transfer movement substantially approximate zero at both the beginning and end of the transfer travel. Suitable linkage means (32, 126) or a scotch yoke means (174) are provided to interconnect the eccentric follower means (30) to the work transfer apparatus (36, 118). In some embodiments the drive mechanism (81, 116, 136, 166) is adapted to allow use of nonreversible power means while still providing a linearly reciprocable work transfer movement with substantially zero jerk.

16 Claims, 16 Drawing Figures

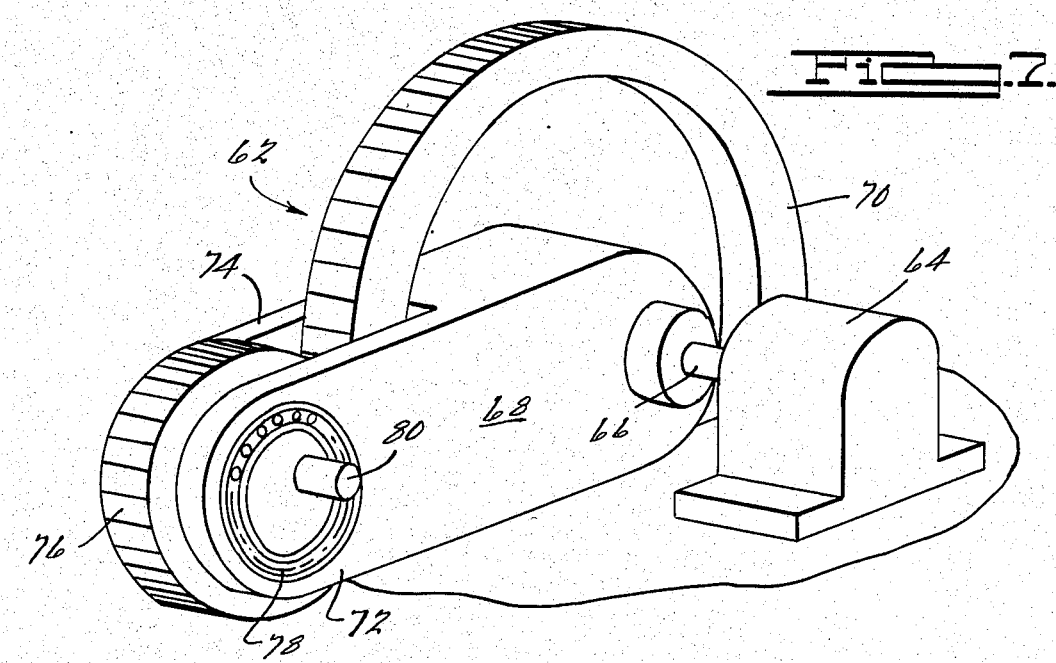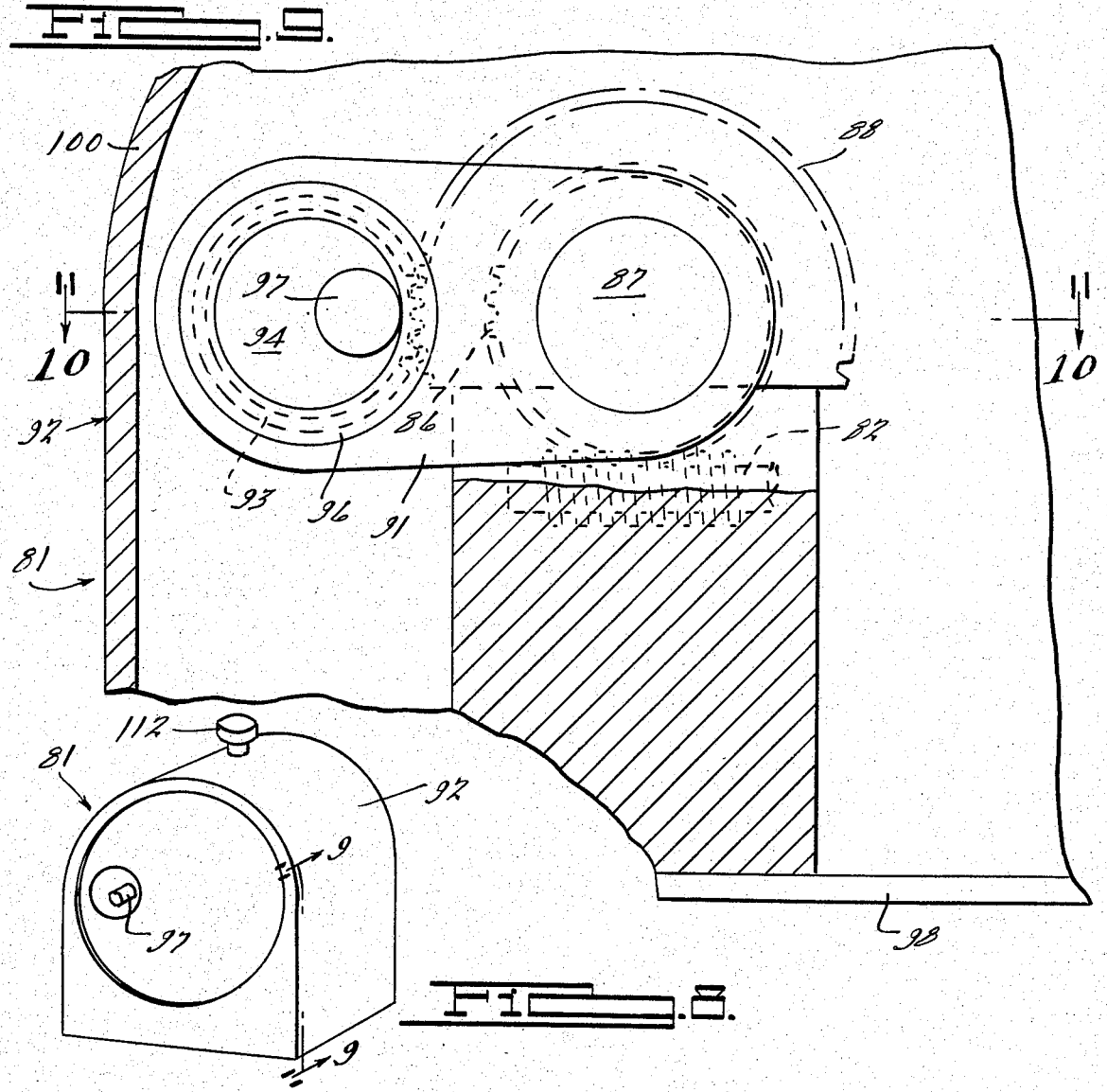

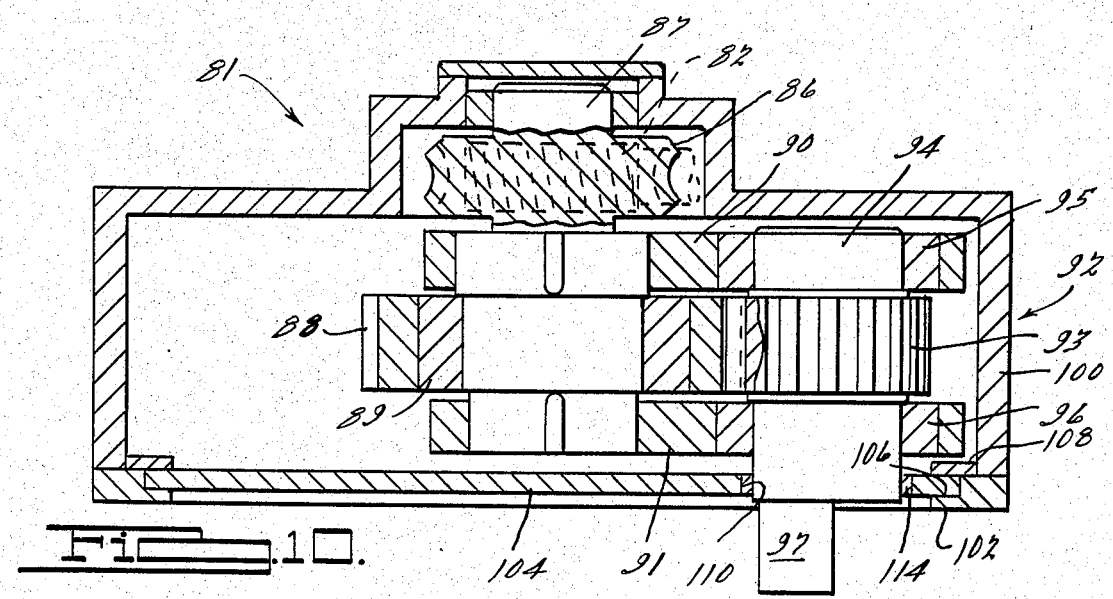
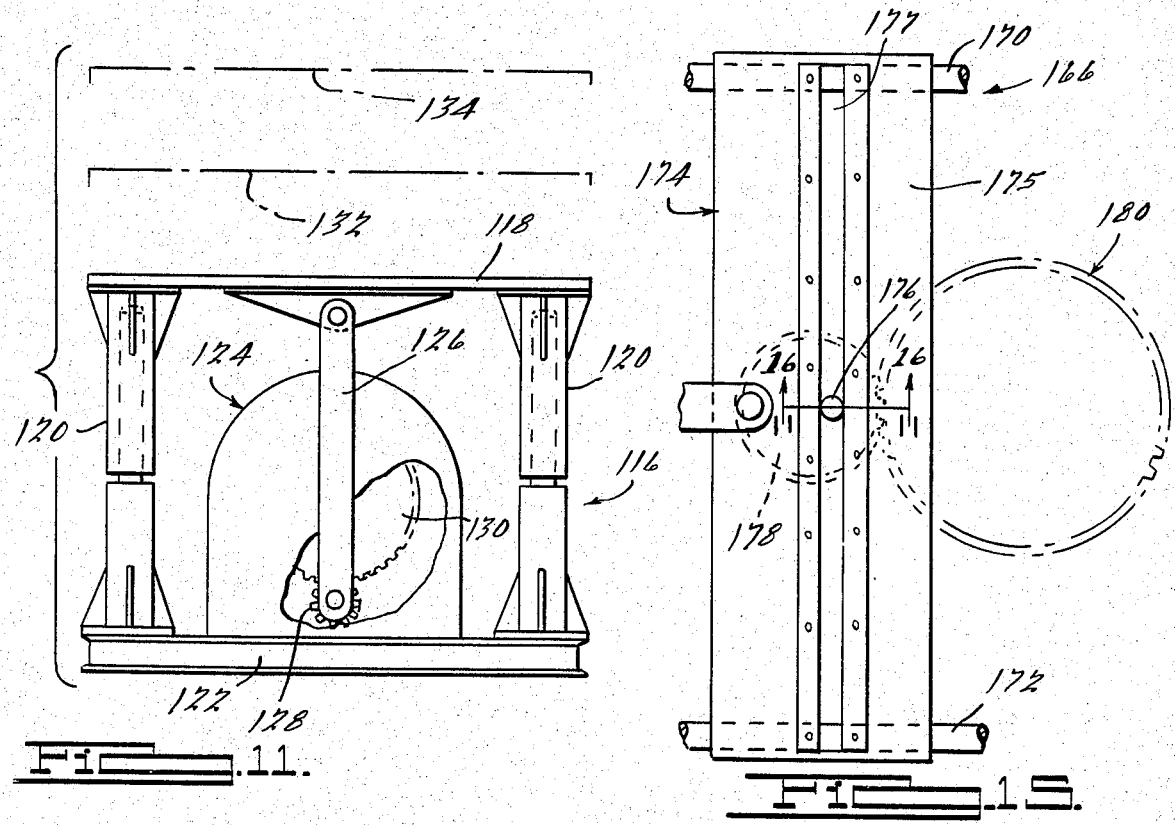
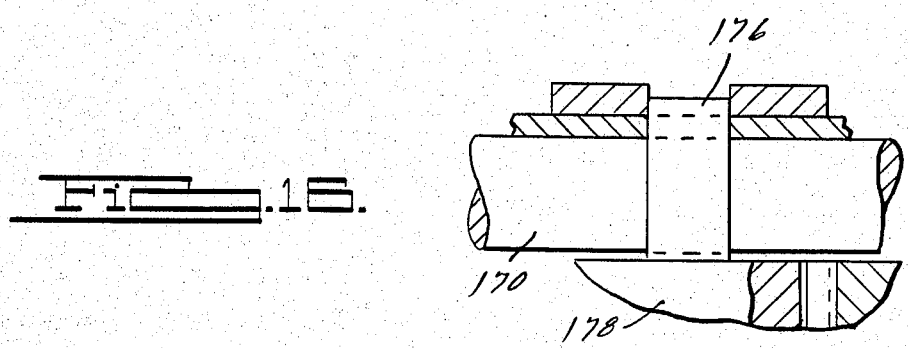

TRANSFER DRIVE APPARATUS

BACKGROUND AND SUMMARY OF THE INVENTION

The present invention relates generally to drive mechanisms for work transfer apparatus and more particularly to such drive mechanisms incorporating both a stationary sun gear and a revolving and rotating planet gear operative to provide a transfer motion characterized by substantially zero acceleration and jerk at both beginning and end of the transfer travel.

Transfer apparatus of various types have long been in use in conjunction with various types of manufacturing and assembly operations in order to advance workpieces between work stations as well as into and out of various types of machinery. Numerous types of drive systems have been developed over the years in order to accomplish this work transfer operation in a rapid and efficient manner. Such drive systems have employed a variety of different combinations of barrel cams, bell cranks, lever arms, or scotch yoke connections and the like. Typically such drive systems are designed to effect operative transfer movement in a single plane and must be able to provide periods of dwell at both beginning and ends of the operational cycle with intermediate periods of acceleration/deceleration.

It is also highly desirable to provide drive systems for such transfer apparatus which are able to smoothly reciprocate the workpieces into and out of the work stations without subjecting either the workpiece or the associated apparatus to shocks or jerk resulting from sudden acceleration or deceleration as the workpiece is moved from or to a stationary position. This is particularly important with regard to such transfer apparatus which are designed for use in assembly or precision machining operations wherein the jerk may dislodge or otherwise dislocate parts being processed although it is desirable to avoid such jerk in all applications because of the adverse effect resulting from subjecting the entire drive train to the stress and strain associated therewith.

It should be noted that as used herein the term "jerk" is defined as the third derivative of displacement with respect to time or the second derivative of velocity with respect to time or the first derivative of acceleration with respect to time.

In addition to reducing or eliminating jerk in such transfer apparatus both at the beginning and end of operational cycles, it is also desirable to design such apparatus to be able to reciprocate the workpiece into and out of the work station as rapidly as possible because this transfer represents lost production time. Also, in order to avoid excessive downtime as well as high maintenance costs, it is highly desirable to design such apparatus as simply as possible with a minimum number of moving parts. Coupled with the desire to maintain the design as simple as possible while still accommodating the other operational aspects required is the desirability to enable the apparatus to be easily fabricated at relatively low cost without sacrificing reliability. While previous transfer drive arrangements have been able to achieve differing measures of success in meeting the above conflicting objectives, none of them have been totally effective in providing a completely acceptable transfer drive assembly.

The present invention, however, provides a transfer drive mechanism which utilizes a gearing system constructed so as to provide a transfer motion in which the workpieces are subjected to substantially zero jerk at either end of the transfer cycle and experience a smoothly but rapidly increasing rate of acceleration/deceleration. The drive mechanism is relatively simple in construction comprising a stationary sun gear and a planet gear in meshing engagement therewith adapted to be driven in revolution around the sun gear and rotated thereby. An eccentric follower pin is provided on the planet gear to which suitable linkage or the like is connected whereby movement of the eccentric follower may be transferred to the workpiece supporting portion of the work transfer apparatus. The diameter of the planet gear and sun gear are selected in accordance with the relative positioning of the eccentric follower pin and the desired distance of travel so as to provide a desired transfer movement of the workpiece characterized by substantially zero acceleration/deceleration and jerk at both the beginnings and end of the transfer motion cycle.

The drive apparatus of the present invention not only substantially provides these highly desirable movement characteristics whereby workpieces may be rapidly and effectively transferred without being jarred out of position but does so with a relatively uncomplicated straightforward mechanism that utilizes relatively few parts and hence may be easily serviced and maintained with a minimum of downtime. Additionally, because the drive apparatus requires relatively few moving parts, it offers excellent reliability.

Additional advantages and features of the present invention will become apparent from the subsequent description and the appended claims taken in conjunction with the accompanying drawings.

BRIEF DESCRIPTION OF THE DRAWINGS

FIG. 7 is a perspective view of another embodiment of the present invention;

FIG. 8 is a perspective view of another embodiment of the present invention;

FIG. 9 is a fragmentary section view of the embodiment of FIG. 8, the section being taken along line 9—9 thereof;

FIG. 10 is another section view of the embodiment of FIG. 8, the section being taken along line 10—10 of FIG. 9;

FIG. 11 is a side elevational view of yet another embodiment of the present invention with portions thereof broken away;

FIG. 15 is a plan view of an embodiment similar to that of FIG. 1 but showing a shuttle carriage assembly for interconnecting the eccentric follower and transfer apparatus; and FIG. 16 is a section view of the embodiment shown in FIG. 15, the section being taken along line 16—16 thereof.

DESCRIPTION OF THE PREFERRED EMBODIMENTS

Figures 1, 2:
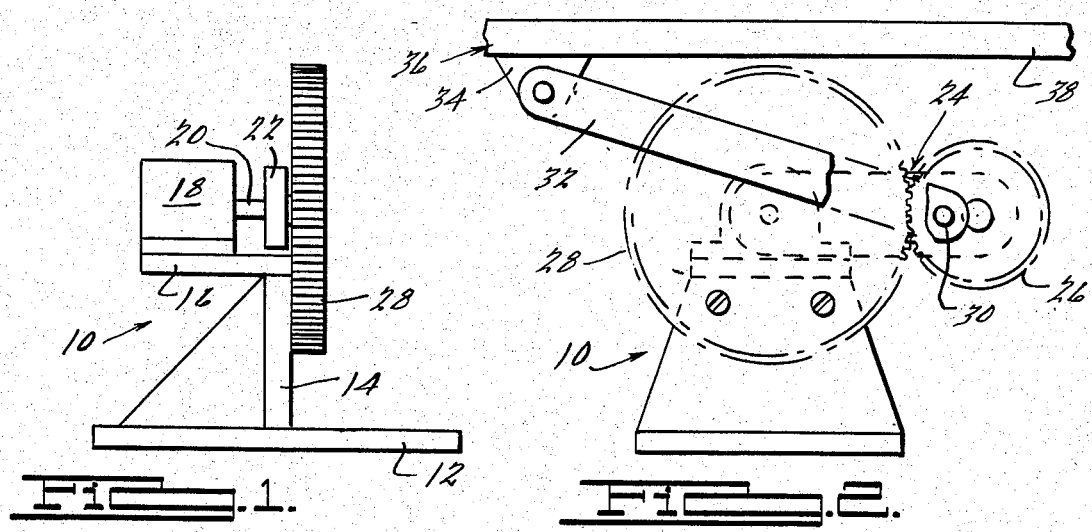
FIG. 1 is a side elevational view of a work transfer drive apparatus in accordance with the present invention.
FIG. 2 is a front elevational view of the work transfer drive apparatus of FIG. 1 but also illustrating in somewhat schematic form associated work transfer apparatus in operative relationship thereto.

Referring now to the drawings and in particular to FIGS. 1 through 4, there is shown a transfer drive mechanism in accordance with the present invention indicated generally at 10.

Transfer drive mechanism 10 comprises a support structure including a base member 12 having an upwardly extending flange member 14 to which is secured an elevated platform member 16.

A suitable drive means 18 is supported on and secured to platform member 16 and has a rotating output shaft 20 to which one end 22 of an elongated crank arm 24 is secured. A planet gear 26 is rotatably secured to the other end of crank arm 24.

A stationary sun gear 28 is also secured to flange 14 of the supporting structure, being positioned with the center axis thereof coaxial with the axis of rotation of output shaft 20 and spaced slightly axially outwardly therefrom.

As best seen with reference to FIG. 2, planet gear 26 is positioned in meshing engagement with stationary sun gear 28 whereby the sun gear will impart a rotational movement to planet gear 26 as crank arm 22 drives it in revolution therearound.

An eccentric follower pin 30 is also provided on planet gear 26 projecting axially outwardly from the side opposite that on which crank arm 24 is positioned. One end of an elongated arm 32 is pivotably secured to the follower pin and adapted to be driven thereby. The opposite end of arm 32 is pivotably connected to a depending flange portion 34 provided on associated workpiece supporting transfer apparatus 36. Transfer apparatus 36 is shown only in exemplary diagrammatic form, it being understood that it will comprise suitable work supporting structure such as rails 38 as shown or the like which are adapted to be linearly reciprocated in a horizontal direction as shown so as to transport a workpiece between or into and out of a desired work station. It should also be understood that such apparatus may also include drive means operative to effect movement of the transfer apparatus in a vertical direction in addition to or in lieu of the horizontal transport drive arrangement as illustrated. The present invention while being described herein as applicable for effecting generally horizontal transfer may also be used in effecting such vertical or even inclined linear movement if desired.

Figure 3:
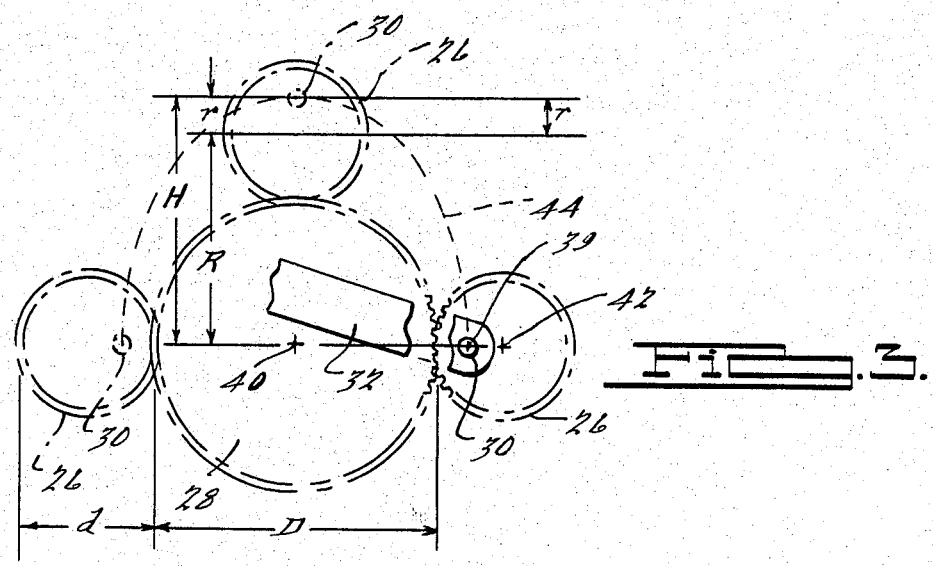
FIG. 3 is a schematic view of the stationary sun gear and associated planet gear shown in operative relationship thereto.

In one preferred embodiment of the invention as illustrated in FIGS. 1-3, the diameter of planet gear 26 will be substantially equal to one-half the diameter of stationary sun gear 28. Thus, because the circumference of sun gear 28 will be twice that of planet gear 26, rotation of 180° of the sun gear would operate to drive the planet gear through a full 360° of angular displacement. However, because sun gear 28 is stationary and planet gear 26 is driven in revolution about the circumference of sun gear 28 so as to impart rotation thereto, it will be seen that the planet gear 26 is rotated through an angular displacement of approximately 540° with respect to a stationary reference point as it is revolved through 180° or one-half the circumference of sun gear 28, 540° being equal to 360° of rotation of planet gear 26 plus 180° of revolution. Thus, let us assume as shown in the full line position of FIG. 3, that at the starting position, the axis 39 of eccentric pin 30 provided on planet gear 28 is positioned on a line extending between the axis 40 of sun gear 28 and the axis 42 of planet gear 26. As planet gear 26 is driven in clockwise revolution around sun gear 28, the meshing engagement therebetween will operate to rotatably drive planet gear 26 also in a clockwise direction. Thus, as crank arm 24 begins its initial movement in an upwardly direction as shown, eccentric pin 30 will move downwardly with respect to axis 42 due to rotation of planet gear 26 as a result of its meshing engagement with sun gear 28. When crank arm 24 has driven planet gear 26 through approximately 90° of revolution, eccentric pin 30 will have traveled through an arc of approximately 270° to a position lying on an extension of a line interconnecting axis 40 and 42 of sun gear 28 and planet gear 26 respectively and as shown in phantom in FIG. 3. As crank arm 24 continues to revolve planet gear through the 180° of revolution, eccentric pin 30 will travel an additional 270° bringing it back into position along a line interconnecting the axis 40 and 42 of the sun gear 28 and planet gear 26 respectively. The actual path traveled by eccentric pin 30 during this combined revolving and rotational movement of planet gear 26 will be generally in the shape of an ellipse bisected along its minor axis as shown by the dotted line 44 in FIG. 3.

With regard to the embodiment shown in FIGS. 1 through 3, it will be noted that elongated arm 32 is pivotably connected to eccentric follower pin 30 provided on planet gear 26 and to flange portion 34. Thus it is only the horizontal component of movement of eccentric pin 30 which will effect horizontal transfer movement of work supporting apparatus 36, the vertical component of movement resulting in pivotal lost motion of arm 32. Preferably, the pivotal connection between arm 32 and flange 34 will be vertically positioned approximately midway between the minimum and maximum vertical positions of eccentric pin 30 or stated another way this connection will be positioned along a plane lying parallel to the direction of movement of work transfer apparatus 36 and spaced from axis 40 of sun gear 28 a distance substantially equal to one-half the maximum distance H between axis 39 and axis 40. This positioning is desirable as it serves to minimize the magnitude of the vertical force component to which the transfer apparatus 36 is subjected to.

In order to effect a smooth work transfer operation, it is desirable to have the horizontal component of acceleration and jerk equal to substantially zero at the initiation of the transfer movement operation and for this component of acceleration to thereafter increase rapidly so as to effect the transfer movement as quickly as possible.

It has been discovered that when eccentric pin 30 is positioned a predetermined distance r from the axis of rotation 42 of planet gear 26, it is possible to obtain a horizontal component of acceleration and jerk which is substantially zero at both the beginning and end of the transfer movement cycle. This predetermined distance r is dependent upon both the distance R between the axis of rotation 42 of planet gear 26 and the axis 40 of sun gear 28 and upon the ratio of their respective diameters; D being the diameter of the stationary sun gear and d being the diameter of planet gear. This predetermined distance may be calculated by the following formula:

$$r = R/(N+1)^2$$

wherein $$N = D/d$$

Thus, in the embodiment of FIGS. 1-3 wherein $D/d = 2$, r may be easily calculated to be equal to 1/9R. The desired displacement X of the transfer apparatus 36 in a horizontal direction may be calculated from the following formula:

$$X = 2(R - r)$$

or for the particular embodiment shown:

$$X = 1\ 7/9R$$

Figure 4:
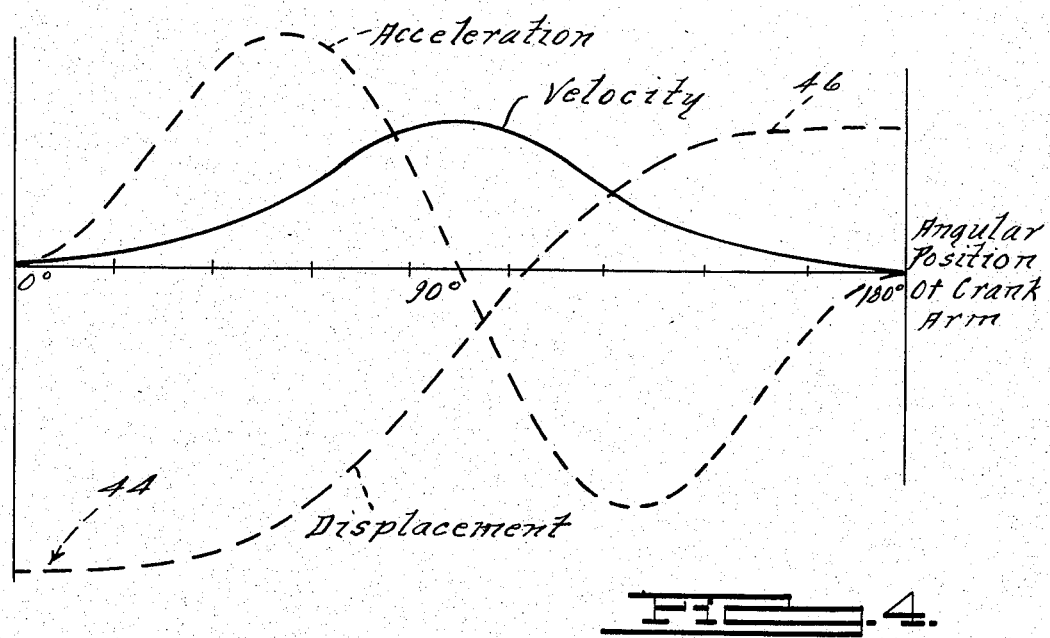
FIG. 4 is a graph plotting the horizontal component of displacement, velocity and acceleration of the accentric follower means as a function of angular displacement of the driving crank.

FIG. 4 shows a plot of the horizontal component of displacement, velocity, and acceleration for eccentric follower pin 30 with respect to the angular displacement of crank arm 24. As can be seen therein, there is an initial dwell period (indicated generally at 44) during which the horizontal component of displacement is substantially zero and follower pin 30 is experiencing movement only in a vertical direction. Once crank arm 24 has moved through an initial angular displacement of approximately 20° it will be seen that the horizontal component of displacement begins to increase. As the work transfer apparatus approaches the opposite extreme of travel, the horizontal component of movement decreases to zero and a dwell period (indicated generally at 46) is provided during which the drive apparatus may be brought to a stop while the workpiece remains in the desired new position.

It will also be noted that both the horizontal velocity and acceleration curves plotted on the graph of FIG. 4 indicate that the movement associated with the work transfer operation is accomplished with an extremely smooth transition from a static condition to a dynamic condition as indicated by the generally concave shape or asymtotes of the velocity and acceleration curves at both the extreme left and right sides of the graph.

It should be noted that while as shown drive means 18 is in the form of a reversible electric motor, various other types of drive means may be easily substituted therefor such as for example hydraulic or air operated motors or pistons and associated linkage or the like operative to provide a rotary output motion whereby rotate crank arm 24 may be rotatably driven through 180° of angular displacement.

Many transfer operations exist where it is desired to effect a vertical lifting of a workpiece either with or without an accompanying horizontal transfer. In such applications it is often necessary that the lifting apparatus actually withdraw out of engagement with the workpiece or associated supporting apparatus so as to provide a clearance for some purpose such as a transfer operation or the like. Accordingly, it is necessary that the lifting apparatus be moved an initial distance before transfer of the workpiece can even begin. Because this initial movement represents lost motion and time during which no work is being accomplished, it is desirable to advance the lifting apparatus as rapidly as possible. However, if the lifting apparatus is allowed to engage the workpiece or associated supporting apparatus at full speed, damage or loss of parts assembled to the workpiece may result or the workpiece may be jarred out of position.

Figure 5:
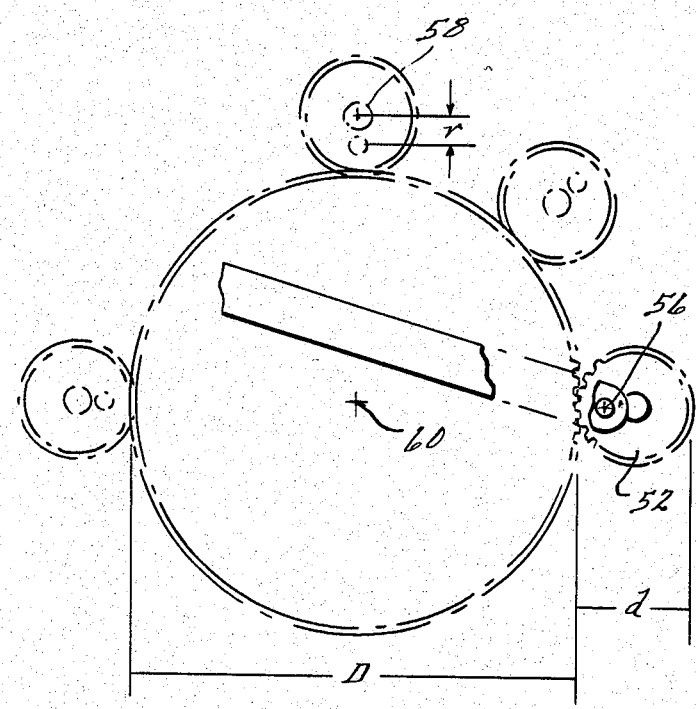
FIG. 5 is a schematic view similar to that of FIG. 3 but illustrating another embodiment thereof.

The present invention is well adapted to overcome these conflicting problems by providing apparatus which may allow for a rapid initial movement of the lifting apparatus to a position proximate the workpiece or the like, to slow it down as it moves into engagement with the workpiece or associated support structure and thence to accelerate it again so as to complete the transfer operation in a minimum amount of time. As shown in FIG. 5 and the accompanying graphical representation of the vertical components of displacement, velocity and acceleration as a function of crank arm angular displacement illustrates, it is possible to achieve a motion characterized by an initial rapid advancement of the lifting apparatus as illustrated by the steep upward slope of portion 48 of the velocity curve. However, as the lift apparatus approaches the workpiece, the velocity decreases as shown by the central depressed portion 50 of the curve so as to effect a relatively reduced velocity engagement with the workpiece whereupon the velocity is immediately increased and thereafter gradually reduced as the workpiece is moved into position. The acceleration curve indicates the rate of change of velocity for the various portions of movement and as before illustrates the gradual but rapidly increasing and decreasing rates of acceleration at each end of the transfer cycle and the generally asymptotic relationship of the curves corresponds to substantially jerk-free starting and stopping.

In order to achieve these transfer movement characteristics a planet gear 52 is utilized having a diameter d equal to one-fourth the diameter D of the stationary sun gear 54. Applying the formula indicated above, it will be noted that the eccentric follower pin 56 provided on planet gear 52 must be positioned a distance r equal to one-twenty-fifth of the distance between the axis of rotation 58 of the planet gear and the axis of the sun gear 60. Thus, the required diameters of these gears may then be selected to provide whatever desired lift or transfer is required. It should be noted that with a 4:1 ratio of diameters, the maximum reduction in velocity will occur at a point one halfway through the 180° rotation of the crank arm and hence if engagement of the workpiece occurs at this location, the maximum displacement of the workpiece will be one-half that of the eccentric follower pin in the direction of transfer motion.

As seen in FIG. 5, the eccentric follower pin will be positioned along a line interconnecting the axis of the planet gear and sun gear at crank angles of 90° increments and the planet gear will rotate through 900° of rotation during each transfer movement.

An alternative embodiment is shown in FIG. 7 wherein drive apparatus 62 includes driving power means 64 having an output shaft 66 connected to one end of a crank arm 68. As shown, in this embodiment the sun gear 70 is in the form of a semi-circular gear ring with the crank arm 68 having a pair of arms 72 and 74 extending outwardly on opposite sides thereof. A planet gear 76 is rotatably supported and secured between the arms by means of bearings 78 and includes an axially outwardly projecting eccentric follower pin 80 to which drive linkage may be connected so as to transmit the driving forces to associated work transfer equipment. The relationship between the respective diameters of planet gear 76 and sun gear 70 and the relative positioning of the eccentric follower pin 80 may be determined in the same manner described above so as to achieve the desired output motion characteristics. As is apparent from the drawings, apparatus 62 provides an arrangement offering greater support to the planet gear and associated pinion whereby greater loads may be transferred.

While each of the above embodiments has incorporated a motive power source having an output shaft directly coupled to the crank arm, it is also possible to utilize other types of input drives. Such an alternative drive mechanism 81 is illustrated in FIGS. 8-10 wherein a worm gear 82 is provided on one end of a drive shaft (not shown) which is driven by a suitable power source. A suitably sized gear 86 is then fixedly connected to one end of a shaft 87 and positioned in meshing engagement with worm gear 82. A stationary sun gear 88 is also provided which may as shown be supported within a suitably shaped housing 92 in substantially coaxial relationship with the gear 86 and shaft 87 which extends theretrough and is supported therein by suitable bearing means 89. A pair of crank arms 90 and 91 each have one end secured to shaft 87 on opposite sides of sun gear 88 and are adapted to be rotatably driven by shaft 87. A planet gear 93 is fixedly supported on a shaft 94 between crank arms 90 and 91 and in meshing engagement with sun gear 88. Shaft 94 extends through openings in respective crank arms 90 and 91 and is rotatably supported therein by suitable bearing means 95 and 96 respectively and includes an appropriately positioned eccentric follower pin 97 extending axially outwardly therefrom.

Thus, as the worm gear 82 is rotatably driven, it will operate to rotate crank arms 90 and 91 via gear 86 at a substantially constant angular velocity thereby revolving planet gear 93 around sun gear 88 which in turn will impart a rotating motion to planet gear 93. The particular desired movement characteristics in substantially any desired single plane may then be obtained by selecting the relative diameters for planet gear 93 and associated sun gear 88 and appropriately positioning the eccentric follower pin 97 in the manner described above.

It will be appreciated that the use of the worm gear drive arrangement may also be utilized to effect any desired gear reduction between the speed of worm gear 86 and the angular velocity of the crank arms 90 and 91 whereby the amplitude of the respective velocity and acceleration curves may be varied to any desired degree. This may provide greater design flexibility than that which may be available by the use of different speed power sources and avoids the need for a separate gear reduction assembly. Of course, it is possible to incorporate a suitable gear reduction or other speed selection means between the crank arm and power source in the previously described embodiments as well should it be desired.

It is also desirable to enclose such transfer drive apparatus for a variety of reasons such as to prevent dirt or debris from disabling or damaging the operating equipment as well as to perhaps provide a sump for lubricating fluid for example. Accordingly, housing 92 includes a supporting base 98 to which a suitable generally U-shaped cover member 100 is fitted to define a chamber within which the drive mechanism is disposed. End wall 102 of cover member 100 has a circular opening provided therein the axis of which is coaxially positioned with respect to the axis of shaft 87. As best seen with reference to FIG. 10, a circular plate member 104 is fitted within an annular recess 106 provided around the circular opening. A retainer ring 108 is secured to end wall 102 to movably retain circular plate member 104 in position. Circular plate member 104 has a circular opening 110 provided therein through which shaft 94 and associated eccentric pin 97 projects. Suitable sealing means 114 may be provided between shaft 112 and opening 110 as well as between end wall 102 and plate 104 if desired thereby enabling the interior of housing 92 to contain a supply of lubricant for the apparatus therein. Suitable vent means 112 may be provided to allow for expansion of the lubricant during operation. In operation, as crank arms 90 and 91 rotate carrying planet gear 93 around sun gear 88, shaft 94 will cause plate 104 to rotate and will also rotate with respect to plate 104.

As previously mentioned, the present drive mechanism is also well suited for use in conjunction with vertically moving work transfer apparatus. Such an embodiment 116 is shown in FIG. 11 wherein a work supporting member 118 is supported upon telescoping posts 120 secured to a base 122 for reciprocable movement with respect thereto. A drive mechanism 124 in accordance with the present invention is disposed below member 118 with a drag link 126 connected thereto. Drive mechanism 124 may be of the type described above with respect to FIGS. 5 and 6 wherein planet gear 128 has a diameter equal to one-fourth the diameter of sun gear 130. Thus, work supporting member 118 will initially accelerate and move rapidly upwardly and slow as it approaches the phantom position indicated at 132 at which it may engage the workpiece and thereafter again accelerate to raise the workpiece up into an operation performing work station such as the phantom position indicated at 134. This sequence will also be repeated as the drive mechanism lowers the workpiece back out of the work station thus coupling high speed work transfer with reduced velocity workpiece pickup and drop off.

Figure 13:
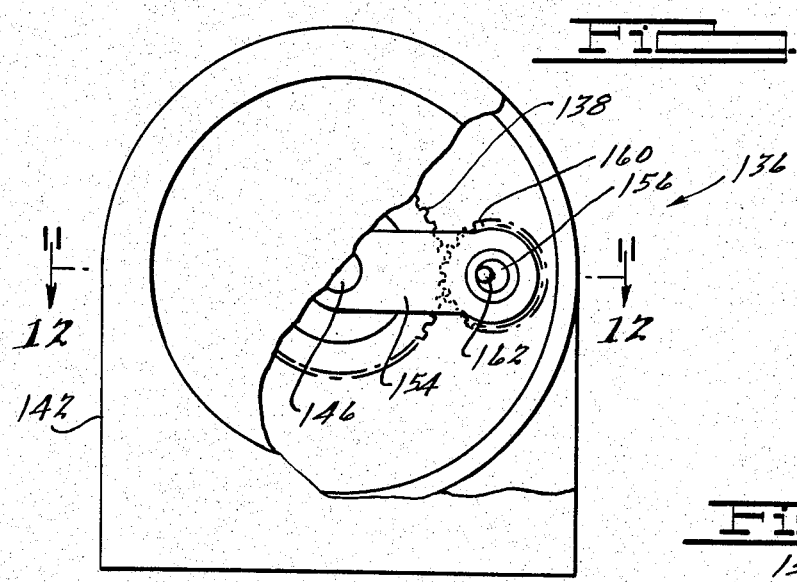
FIG. 13 is a side elevational view of the embodiment of FIG. 12 shown partially in section.
Figure 12:
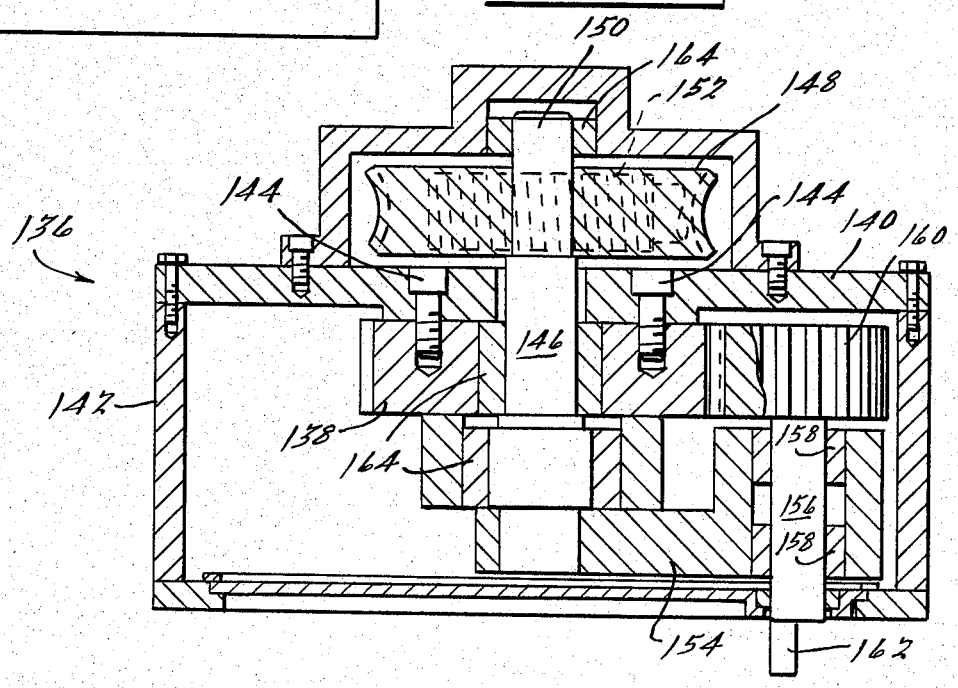
FIG. 12 is a section view of an embodiment similar to that of FIG. 8 but designed for use with a nonreversing power source, the section being taken along line 12—12 of FIG. 13.

In each of the previously described embodiments, it has been necessary to reverse the direction of rotation of the input shaft in order to retract or reverse the direction of movement of the associated work transfer equipment. However, the present invention may also be utilized to provide a full advance and retract work transfer cycle without requiring the use of a reversible power source. Such an embodiment is illustrated in FIGS. 12 and 13 being indicated generally at 136.

Drive apparatus 136 is somewhat similar to the embodiment illustrated in FIG. 8 and comprises an annular sun gear ring 138 having one side secured to an upwardly extending supporting member 140 which may also form a rear wall for housing 142 by suitable bolts 144. A shaft 146 projects through both sun gear 138 and member 140 and has a drive gear 148 secured to one end 150 thereof. A worm gear 152 is positioned in driving meshing engagement with gear 148 which is operative to transmit rotational driving forces from a suitable power source. A crank arm 154 is secured to the other end of shaft 146 and rotatably supports a shaft 156 at the outer end thereof by means of suitable bearings 158. A planet gear 160 is secured to one end of shaft 156 in engaging relationship with sun gear 138. An eccentric pin 162 extends axially outwardly from the opposite end of shaft 156. Suitable bearings 164 are also provided to rotatably support shaft 146 as well.

As described previously, the desired motion characteristics which include substantially zero acceleration and jerk at both beginning and end of the transfer operation may be obtained by providing sun and planet gears 138 and 160 respectively with the appropriate relative diameters and positioning eccentric follower pin 162 in accordance with the previously mentioned formula. It should be noted, however, that in this embodiment it is necessary that the ratio of the planet and sun gear diameters be an even integer in order that the advance and retract portions of the transfer cycle each consume no more than one-half or 180° of the angular displacement of crank arm 154.

Because sun gear 138 is supported only on one side thereof in coaxial relationship with shaft 146, planet gear and the associated crank arm 154 are free to move complete therearound thus enabling the need to reverse the drive means at opposite ends of the transfer movement.

Figure 14:
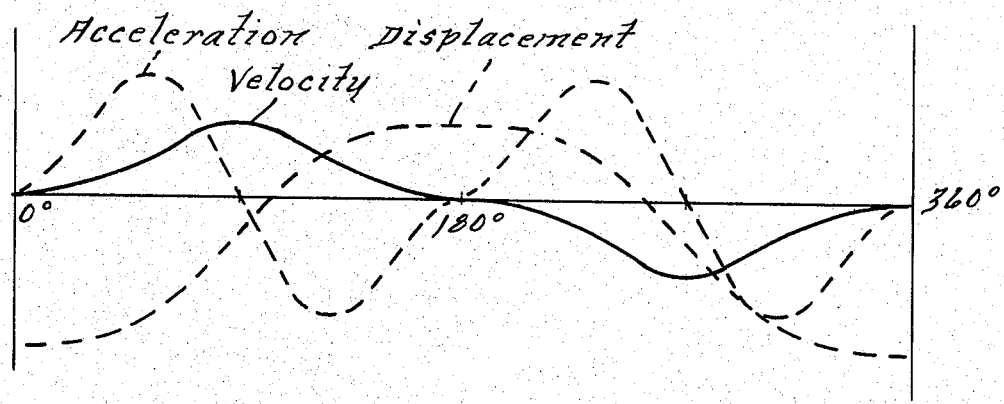
FIG. 14 is a graph similar to that of FIG. 4 but plotting the horizontal component of displacement, velocity, and acceleration as a function of angular displacement of the driving crank over a full cycle of operation for the embodiment of FIGS. 12 and 13.

Thus, as may now be apparent, this embodiment will produce transfer movement having the displacement, velocity and acceleration characteristics as shown in the graph of FIG. 14 during the 360° of crank arm rotation assuming a two to one ratio of sun and planet gear 138 and 162 diameters with the first portion of rotation through 180° of crank arm angular displacement representing an advance portion of the transfer cycle and the second 180° of rotation representing a retraction portion of the transfer cycle. Additionally, there will be provided a period of dwell at each end of the transfer movement during which substantially all movement of eccentric pin 162 will be in a direction at right angles to the desired direction of work transfer. This provides a period of time during which the input power may be disengaged or shut off so as to allow time for an operation to be performed on a workpiece as well as providing a substantially no load startup of the drive means.

The drive mechanism is also well suited for use with scotch yoke shuttle type transfer apparatus, such an embodiment being indicated generally at 166 in FIGS. 15 and 16. In this embodiment, a shuttle assembly is provided which comprises a pair of elongated spaced substantially parallel guide rails 170 and 172 and a reciprocable carriage assembly 174. Carriage assembly 174 includes a transversly extending plate member 176 having an elongated slot 177 provided therein extending generally perpendicularly to the axis of guide rails 170 and 172 which is adapted to receive eccentric follower pin 176 provided on planet gear 178 forming a part of the drive assembly 180. Drive assembly 180 will preferably be of the type shown and described with reference to FIGS. 13 and 14 but modified so as to provide movement in a horizontal plane. It should be noted, however, that any one of the drive arrangements disclosed herein may be substituted therefor.

Preferably, in order to avoid the need for a reversible power source, the axis of the sun gear will be positioned substantially midway between quide rails 170, 172 with the guide rails being spaced a distance sufficient to accommodate full 360° swing of the crank arm and associated planet gear. However, should space limitations require, a reversible power source may be used in which case the spacing between guide rails may be reduced by approximately one-half, the axis of the sun gear being positioned closely adjacent one of guide rails 170, 172. While carriage assembly 174 may be directly secured to the undersurface of a reciprocating work supporting means or alternatively, a suitable drag link 182 may be provided connected between carriage assembly 180 and the work supporting transfer means.

Figure 6:
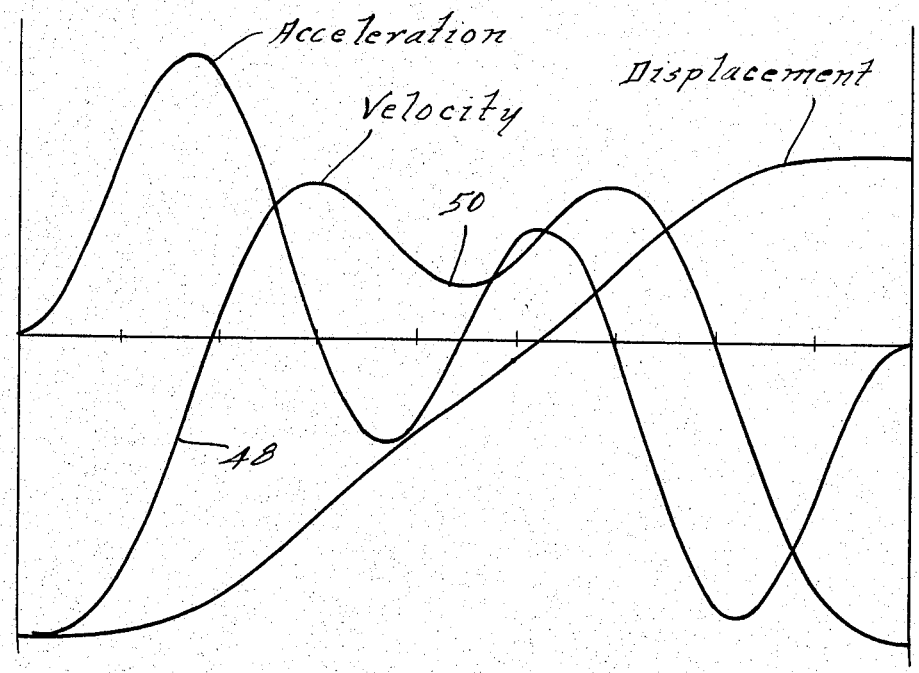
FIG. 6 is a graph similar to that of FIG. 4 plotting the horizontal component of displacement, velocity and acceleration for the embodiment of FIG. 5.

It should be noted that while the graphs of FIGS. 4, 6, and 14 show the movement characteristics of the eccentric follower in a single plane, the actual movement characteristics of the work supporting means being operated thereby will vary slightly due to the presence of the drag link connection between the eccentric pin and work supporting means. The reason for this variance is that because the drag link pivots about its connection at the work transfer means and has a fixed length, the opposite end thereof trances an arcuate movement path. However, initial movement of the eccentric follower pin is in a substantially linear direction generally perpendicular to the direction of work transfer movement. Thus, the eccentric follower pin will prevent arcuate movement of the drag link end connected thereto and therefore effect a slight movement of the transfer apparatus. Of course, the degree of movement will be inversely proportional to the length of the drag link and thus this variance may be minimized by use of longer drag link connections. However, the use of the scotch yoke drive assembly of FIG. 15 totally avoids any variance between the movement characteristics of the eccentric follower pin and carriage assembly as the connection therebetween provides the equivalent of an infinitely long drag link.

Thus, the present invention provides an extremely flexible, relatively inexpensive work transfer drive apparatus which may be easily fabricated and readily adapted for use in a wide variety of cyclical work transfer operations while in each case providing very smooth but nevertheless rapid acceleration without subjecting the transfer equipment or workpieces to excessive jerk. Additionally, because of the relatively few number of parts and the relatively uncomplicated design, improved reliability of the work transfer apparatus may be achieved thereby reducing costly downtime and facilitating the performance of preventive maintenance and inspection of the operating equipment.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a work transfer apparatus including means for reciprocatingly moving workpiece supporting means, an improved drive means operative to alternately advance and retract said workpiece supporting means, said drive means comprising:
   an input shaft including reversible motor means for rotatably driving same;
   a sun gear supportingly secured in coaxial relationship to said input shaft;

crank arm means including a pair of spaced arms each having one end secured to said input shaft and adapted to be rotatably driven thereby;

a planet gear rotatably journaled between the other ends of said spaced arms and positioned in meshing engagement with said sun gear, said crank arm means being operative to drive said planet gear in revolution and said sun gear being operative to drive said planet gear in rotation;

an eccentric follower pin provided on said planet gear; and linkage means having one end connected to said eccentric follower pin and the other end connected to said workpiece supporting means, said eccentric follower pin being positioned a predetermined distance r from the axis of rotation of said planet gear, said predetermined distance being related to the distance R between the axis of rotation of said planet gear and the axis of said sun gear and N the relative diameters of said planet and sun gears such that r is approximately equal to $R/(N+1)^2$ whereby movement of said eccentric follower pin in at least one plane will be characterized by an initial dwell period followed by a gradually but rapidly increasing acceleration accompanied by substantially zero jerk upon initial angular displacement of said crank arm.

2. An improved drive means as set forth in claim 1 wherein said input shaft is operative to rotate said crank arm through an angular displacement of 180°.

3. An improved drive means as set forth in claim 1 wherein said sun gear is nonrotatably secured to support means.

4. An improved drive means as set forth in claim 1 wherein said input shaft includes a worm gear positioned in meshing engagement with a drive gear secured to said one end of said crank arm.

5. An improved drive means as set forth in claim 1 wherein said sun gear comprises a gear ring.

6. An improved drive system for work transfer apparatus comprising:

a stationary sun gear means;

a planet gear positioned in meshing engagement with said sun gear;

means for driving said planet gear in revolution about at least a portion of said sun gear; and eccentric follower means on said planet gear, said eccentric follower means being positioned a distance r from the axis of rotation of said planet gear where $r = R/(N+1)^2$ and R = the distance between the axis of said planet gear and the axis of said sun gear;

N = an even whole number which is equal to the diameter of said sun gear divided by the diameter of said planet gear;

said eccentric follower means being drivingly connected to said work transfer apparatus and operative to drive said work transfer apparatus in a first direction during a first portion of said revolution of said planet gear and to drive said work transfer apparatus in an opposite direction during a second portion of said revolution;

said drive system being operative to provide a dwell period between each change in said direction of movement while said planet gear driving means continues to drive said planet gear and said work transfer apparatus is accelerated with substantially zero jerk.

7. An improved drive system as set forth in claim 6 wherein said means for driving said planet gear is operative to drive said planet gear through 360° of revolution.

8. An improved drive system as set forth in claim 7 wherein said drive system is operative to provide a dwell period between each change in said direction of movement while said planet gear driving means continues to drive said planet gear.

9. An improved drive system as set forth in claim 6 wherein said means for driving said planet gear comprises an input shaft positioned substantially coaxially with said sun gear and means interconnecting said input shaft and said planet gear.

10. An improved drive system as set forth in claim 9 wherein said interconnecting means comprises a crank arm.

11. An improved drive system as set forth in claim 6 wherein said work transfer apparatus comprise a carriage assembly, means movably supporting said carriage assembly for reciprocable movement thereof and said carriage assembly including means defining an elongated slot extending substantially perpendicular to the direction of desired movement of said carriage assembly, said eccentric follower means being received within said slot to effect reciprocable movement of said carriage assembly.

12. An improved drive system for work transfer apparatus comprising:

a stationary sun gear;

a planet gear positioned in meshing engagement with said stationary sun gear;

means for driving said planet gear in revolution about at least a portion of said sun gear, said sun gear being operative to impart a rotary motion to said planet gear;

eccentric follower means on said planet gear, said eccentric follower means being initially positioned along a line extending between the axis of rotation of said planet gear and the axis of said sun gear and spaced a predetermined distance r from said axis of said planet gear such that the movement of said eccentric follower in a direction parallel to the line along which said follower is initially positioned is initiated with substantially zero jerk wherein $r = R/(N+1)^2$ and R = the distance between the axis of said planet gear and the axis of said sun gear;

N = the diameter of said sun gear divided by the diameter of said planet gear;

said work transfer apparatus being adapted to be moved along a plane lying substantially parallel to said line and initial movement of said eccentric follower means is in a direction substantially perpendicular to said plane such that said drive system being operative to provide a dwell period for said work transfer apparatus while said planet gear driving means drives said planet gear whereby said driving means may be started under substantially no load conditions.

13. An improved drive system as set forth in claim 12 wherein N is equal to an even whole number and the velocity along said line of said follower means is reduced for a portion of said movement intermediate each half cycle of said work transfer apparatus.

14. An improved drive system for work transfer apparatus comprising:
- a stationary sun gear having a predetermined diameter;
- a planet gear positioned in meshing engagement with said stationary sun gear and having a diameter equal to one-half said predetermined diameter;
- means for driving said planet gear in revolution about at least a portion of said sun gear, said sun gear being operative to impart a rotary motion to said planet gear;
- eccentric follower means on said planet gear, said eccentric follower means being initially positioned along a line extending between the axis of rotation of said planet gear and the axis of said sun gear and spaced a predetermined distance r from said axis of said planet gear such that the movement of said eccentric follower in a direction parallel to the line along which said follower is initially postioned is initiated with substantially zero jerk and an initial dwell period during which said driving means is allowed to start under minimal loading;
- a carriage assembly;
- means movably supporting said carriage assembly for reciprocable movement thereof in a direction substantially parallel to said line,
- said carriage assembly including means defining an elongated slot extending substantially perpendicular to the direction of desired movement of said carriage assembly;
- said eccentric follower means being received within said slot to effect reciprocable movement of said carriage assembly and
- said predetermined distance r being equal to $R/(N+1)^2$ and
  - R = the distance between the axis of said planet gear and the axis of said sun gear;
  - N = an even whole number which is equal to the diameter of said sun gear divided by the diameter of said planet gear;
- said drive system being operative to provide a dwell period between each change in said direction of movement while said planet gear driving means continues to drive said planet gear and said work transfer apparatus is accelerated with substantially zero jerk.

15. An improved drive system as set forth in claim 14 wherein said predetermined distance is equal to one-ninth of the distance between said axis of said planet gear and said axis of said sun gear.

16. An improved drive system as set forth in claim 14 wherein the maximum displacement of said eccentric follower means is equal to twice the distance between said axis of said planet gear and said sun gear less twice said predetermined distance.

* * * * *